Dec. 27, 1960 W. B. PEGRAM 2,966,315
TENSIONER
Filed Nov. 7, 1957 2 Sheets-Sheet 2
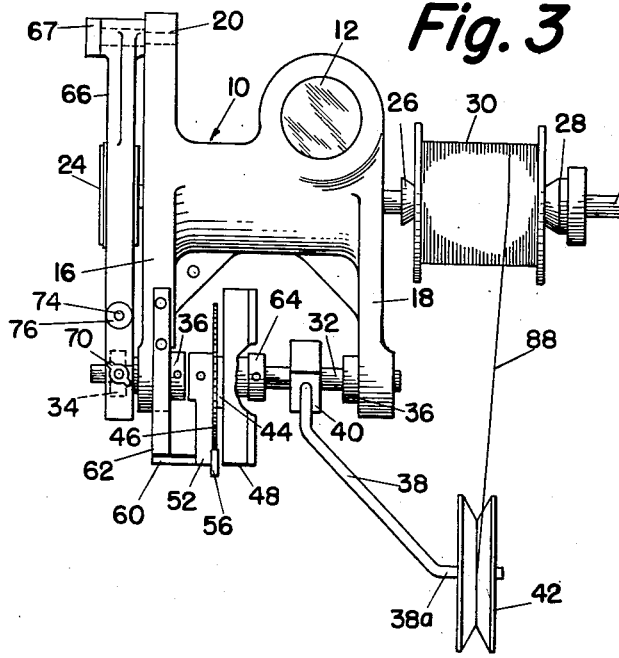
Fig. 3
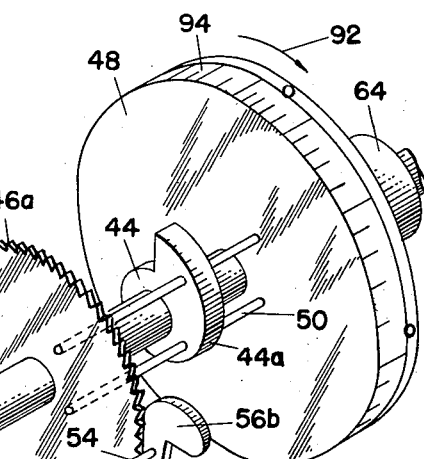
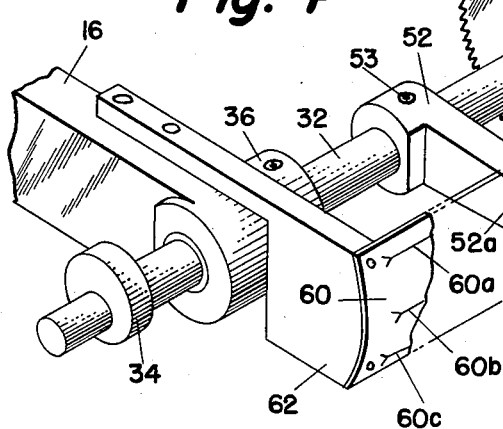
Fig. 4
INVENTOR.
WILLIAM B. PEGRAM
BY
Donald S. Cohen
ATTORNEY United States Patent Office 2,966,315
Patented Dec. 27, 1960

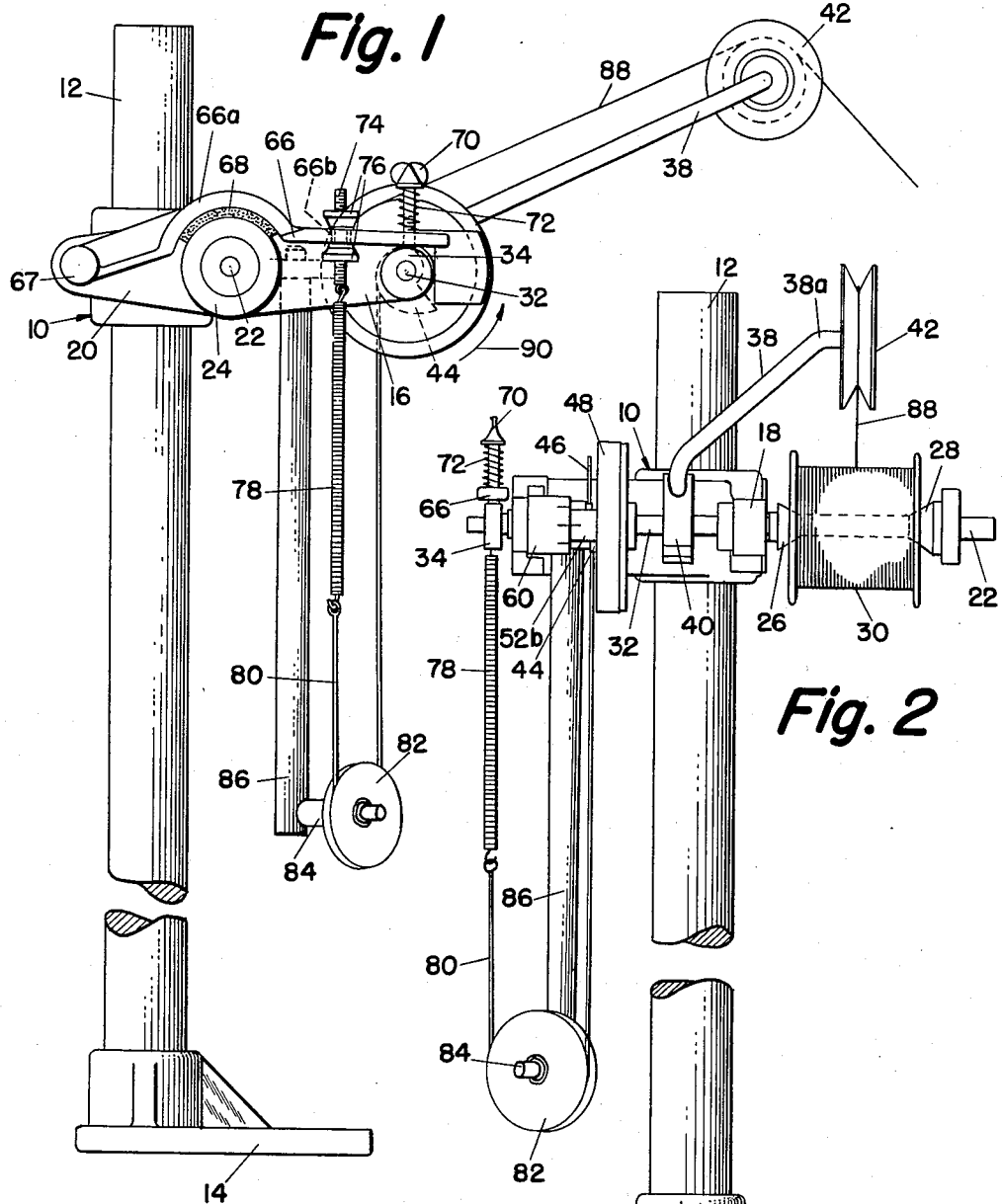

2,966,315
TENSIONER

William B. Pegram, Swarthmore, Pa., assignor to International Resistance Company, Philadelphia, Pa.

Filed Nov. 7, 1957, Ser. No. 694,943

9 Claims. (Cl. 242—156.2)

This invention relates to an improved tensioner for controlling the unwinding of a thread or fine wire from a spool.

Many electrical components, such as resistors and inductors, comprise a fine wire wound on a core or bobbin. In the manufacture of such components, it is necessary to maintain the wire being wound on the core or bobbin under a substantially uniform tension throughout the winding operation in order to obtain a smooth, tight winding. For this purpose, a tensioning device is used to control the force on the wire being fed from a supply spool to the winding apparatus, as the winding speed varies.

One common type tensioning device comprises a rotatable shaft on which the supply spool is mounted and which has a brake drum thereon. A brake shoe is spring pressed against the brake drum to control the speed of rotation of the shaft and spool. To maintain uniform tension as the winding apparatus increases and decreases in speed during the starting and stopping of the winding operation, a pivotal arm is provided around which the wire passes. The arm operates a cam which engages the brake shoe so that pivotal movement of the arm causes the brake shoe to move away from or against the brake drum. Thus, as the speed of rotation of the winding apparatus increases during the starting of the winding operation, a pull is applied to the wire which causes the wire to pivot the arm in a manner such that the cam will move the brake shoe away from the brake drum and thus permit the supply spool to rotate faster to maintain the proper tension in the wire. When the winder reaches its operating speed the inertia of the spool will cause it to rotate too fast and thereby allow slack in the wire. A spring attached to the arm will pull the arm back against the wire and thereby reapply braking pressure to slow down the spool until it also reaches proper operating speed. When the winding apparatus slows down at the end of the winding operation, slack will be provided in the wire causing the arm to be pulled back and thereby applying braking pressure to slow down the rotation of the supply spool. Also, during the winding operation, as the wire is used, the diameter of the winding on the supply spool decreases thus providing less wire per revolution of the spool. As this happens, the tension in the wire increases causing it to pivot the arm and release the braking pressure to allow the spool to rotate faster and maintain the desired tension.

Although this type of tensioner provides the substantially uniform wire tension through the winding operation, those presently on the market having many disadvantages. In the manufacture of electrical components, it is often necessary to use the same winding apparatus for winding various diameter wires. Therefore, it becomes necessary to be able to easily and quickly vary the tension provided by the tensioner to that required by each different size wire. On the present devices the tension is varied by changing the length of the brake shoe spring and the desired tension is obtained by a trial and miss system. Thus, to obtain the desired tension is difficult and time consuming and if the setting of the spring is changed from the proper setting it is difficult to re-obtain it. Another problem arises from the fact that no matter what size wire is being wound, it always requires the same amount of force on the arm by the wire to release or tighten up on the brake. Therefore, for a fine wire, requiring a light tension, the force needed to activate the arm is large as compared to the tension on the wire and for a relatively heavy wire, requiring a heavy tension, the force will be comparatively light. Thus, in these cases, either the arm will not be activated properly to provide the necessary control on the spool or the wire will be broken through over tension before it can activate the arm.

It is therefore an object of this invention to provide a tensioning device which can be easily and quickly preset to provide the desired tension for the size thread or wire to be used. It is another object of this invention to provide a tensioner in which the forces necessary to actuate the brake varies with the tension being applied to the filament. It is a further object of this invention to provide a tensioner in which the force necessary to actuate the brake is a desired percentage of the tension being applied to the filament. Other objects of the invention will in part be obvious and will in part appear hereinafter.

The invention accordingly comprises the features of construction, combination of elements and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

Figure 1 is a side elevation view of the tensioner of this invention;

Figure 2 is a front elevation view of the tensioner;

Figure 3 is a top elevation view of the tensioner; and

Figure 4 is an exploded perspective view of the tension presetting mechanism of the tensioner.

Referring to Figures 1, 2 and 3 of the drawing, the tensioner comprises a bracket 10 (Figure 3) mounted on a post 12 which is supported on a base 14 (Figures 1 and 2). Bracket 10 has a pair of spaced substantially parallel forwardly extending arms 16 and 18 at the sides thereof and a rearwardly extending arm 20 substantially in alignment with forwardly extending arm 16. A shaft 22 extends through and is rotatably supported by bracket 10. A brake drum 24 is mounted on the end of shaft 22 adjacent arms 16 and 20 and a pair of conical clamping members 26 and 28 are on the other end of the shaft 22 for mounting a filament or wire supply spool 30 on the shaft. A second shaft 32 extends through and is rotatably supported in holes in the ends of arms 16 and 18. The second shaft 32 extends beyond arm 16 and has a brake operating cam 34 eccentrically mounted on the extension. A pair of thrust collars 36—36 are mounted on the shaft 32 in abutting relation to the inside surfaces of arms 16 and 18 to prevent longitudinal motion of the shaft. An actuator arm 38 is secured to shaft 32 by a clamping member 40. Arm 38 extends radially forwardly from shaft 32 and axially thereof toward the supply spool mounting portion of shaft 22. The end portion 38a of arm 38 is bent to extend horizontally in front of the supply spool mounting portion of shaft 22 and a V-grooved pulley 42 is rotatably mounted on the end portion 38a. Also mounted on shaft 32 is the tension adjusting mechanism.

As can be more clearly seen in Figure 4, the tension adjusting mechanism comprises a cam 44 rotatably mounted on shaft 32 and having a spiral cam surface 44a, which for reasons which will be explained later, is in the form of a logarithmic spiral. A disk 46 having ratchet teeth 46a around its periphery is rotatably mounted on shaft 32 on one side of cam 44 and an actuating wheel 48 is likewise rotatably mounted on shaft 32 on the other side of the cam. The cam 44, disk 46 and wheel 48 are connected to rotate together by pins 50. An arm 52 is mounted on shaft 32 next to disk 46 and is secured to the shaft by a set screw 53. Arm 52 extends radially from shaft 32 to a point beyond the periphery of disk 46 and has a groove 52a in its side adjacent the disk and a flange 52b extending substantially parallel to shaft 32 across disk 46 and cam 44 to the side of wheel 48 (see Figure 2). Flange 52b has an indicator line or groove 52c on its outer surface for reasons which will be explained later. A pivot pin 54 is mounted in the bottom of groove 52a and extends substantially parallel to shaft 32 to a point in front of disk 46. A ratchet arm 56 is pivotally mounted on the end of pivot pin 54 and has a pointed tooth 56a at its bottom end extending toward the periphery of disk 46 and a projection 56b extending from its top end away from the disk over the top edge of flange 52b on arm 52. A spring 58 is mounted on pivot pin 54 with its legs 58a and 58b under compression between the inside surface of flange 52b and the bottom end of ratchet arm 56 respectively so as to urge and hold ratchet arm tooth 56a in engagement with the teeth 46a on disk 46. Thus, through ratchet arm 56 and arm 52 the disk 46, cam 44 and wheel 48 are secured to shaft 32 to rotate therewith. By pressing in on ratchet arm projection 56b the ratchet arm tooth 56a is disengaged from the teeth 46a on disk 46 to permit rotation of cam 44 with respect to shaft 32. An indicator plate 60 is mounted from bracket arm 16 by a support 62 and extends substantially parallel to shaft 32 up to and in alignment with flange 52b. The indicator plate 60 has three substantially parallel spaced indicator lines or grooves 60a, 60b and 60c on the outer surface thereof for reasons which will be explained later. For clarity Figure 4 shows the various parts of the tension adjusting mechanism in spaced relation. However, as seen in Figure 3, the disk 46, cam 44 and wheel 48 are actually compact together and are held with only a slight clearance next to arm 52 by a collar 64 which is secured to shaft 32. Likewise ratchet arm 56 is next to the side of arm 52 with spring 58 fitting into groove 52a.

A brake arm 66 is pivotally mounted at one end on a pivot pin 67 extending from the side of bracket arm 20 (Figures 1 and 3). Brake arm 66 extends over brake drum 24 and brake operating cam 34. The portion 66a of brake arm 66 which extends over the brake drum 24 is curved and has a brake lining 68 of felt or other friction material bonded thereto for engagement with the brake drum 24. A thumb screw 70 is threaded through a hole in the brake arm 66 over the brake operating cam 34 for engagement with the cam. A cylindrical spring 72 surrounds thumb screw 70 and is held under compression between the head of the screw 70 and the brake arm 66 to hold the screw in position at any desired setting. A threaded pin 74 extends vertically through a hole 66b in the brake arm between the thumb screw 70 and the brake drum engaging portion 66a. A pair of nuts 76 are threaded on pin 74, one on each side of the brake arm 66, to lock the pin in a desired position. An elongated spring 78 has one end connected to the bottom end of pin 74 and hangs vertically downwardly therefrom. A cord or wire 80 is attached to the bottom end of spring 78 and extends down to and around pulley 82 and then up to cam 44 where it is attached to the spiral surface 44a thereof at the point on the surface of smallest radius. Pulley 82 is rotatably mounted on spindle 84 which extends horizontally from supporting rod 86 secured to and extending downwardly from bracket 10.

In the operation of the tensioner, the spool 30 of the filament or wire is mounted on shaft 22 and secured thereto by clamping members 26 and 28. The filament or wire 88 is passed over pulley 42 and then downwardly to the winding apparatus (not shown). Elongated spring 78, which is placed under tension as will be explained later, pulls brake arm 66 against brake drum 24 to control the speed of rotation of the supply spool 30. Spring 78 also applies a force on the outer surface 44a of cam 44 which tends to rotate the cam and thereby shaft 32 in the direction of arrow 90 in Figure 1. This causes pulley 42 to move upwardly to apply a desired tension on the filament or wire 88. If, during the winding operation, the tension on the filament 88 increases over the pre-set tension, which may happen during the starting up of the winding apparatus or during the winding by an increase in speed of the winding apparatus, the filament will pull down on arm 38 causing shaft 32 to rotate in the direction opposite to arrow 90. This rotates brake operating cam 34 in a manner to lift up brake arm 66 and allow shaft 22 and thereby the supply spool 30 to rotate faster. As the speed of rotation of supply spool 30 increases the tension in the filament 88 will decrease allowing arm 38 to rise up again. This in turn lowers brake arm 66 against the brake drum 24 to slow down the speed of spool 30 until the pre-set tension in the filament 88 is again reached. On the other hand, if the tension in the filament 88 becomes less than the pre-set tension, such as when the winding apparatus is slowed down, slack will be permitted in the filament and the arm 38 will rise up. This will rotate brake operating cam 34 to lower brake arm 66 against brake drum 24 and thereby slow down the speed of spool 30. As the speed of spool 30 decreases the tension in filament 88 will be increased and the filament will move arm 38 down again. This in turn raises brake arm 66 until the spool is again rotating at the proper speed to maintain the pre-set tension in the filament. By this operation, any changes in the tension in filament 88 from the pre-set tension will automatically be compensated for.

To pre-set a desired tension, disk 46 is released by pressing forward on ratchet arm projection 56b to pivot tooth 56a away from between the teeth 46a on disk 46. Wheel 48 can then be rotated with respect to shaft 32 to rotate cam 44 and thereby vary the tension of spring 78. By rotating wheel 48 in the direction of arrow 92 (Figure 4) the cord 80 will be wound on cam surface 44a to increase the tension and rotation of the wheel in the opposition direction decreases the tension. Wheel 48 is provided on its rim with indicia 94 corresponding to the calibration of the tension provided by spring 78. Thus, to obtain a desired tension setting, the proper indicia mark on wheel 48 is brought into alignment with the indicator line 52c on arm 52. However, this tension is obtained only when arm 52 is in a horizontal position during the operation of the tensioner. To obtain this condition, the filament 88 is pulled over pulley 42 either by hand or on a winding apparatus to see if indicator line 52c on arm 52 remains in alignment with the center indicator line 60b on indicator plate 60. If the two indicator lines 52c and 60b do not line up they can be brought into alignment by rotation of thumb screw 70 on brake arm 66. If line 52c is lower than line 60b thumbscrew 70 is rotated to move brake arm 66 away from brake operating cam 34 until line 52c rises into alignment with line 60b. If line 52c is higher than line 60b, the thumbscrew is turned to bring brake arm 66 down closer to cam 34. With the two indicator lines in alignment, the tensioner is ready for operation at the tension indicated on wheel 48.

Since to vary the tension the wire or cord 80 is wound around the spiral cam 44 which is preferably a logarithmic spiral, the tension obtained is not only a function of the tension in spring 78 but is also a function of the radius of the cam 44 at the point the cord 80 first contacts the cam. This feature provides the tensioner with many advantages over tensioners heretofore available in which one spring is used to apply tension to the brake arm and a second separate spring is used to apply tension to the brake actuating arm. Since two separate springs were used, the amount of variation in the tension of the filament necessary to operate the brake to correct for changes in the tension would always be the same no matter what tension was being applied to the filament. However, in the tensioner of this invention, since the tension on the filament is a function of both the tension in the spring 78 and the moment arm of the cam 44 which moment arm is larger for high tension settings than for low tension settings, the amount of variation in the tension of the filament necessary to operate the brake will be larger at high tension settings than it would be at low tension settings. Thus, the variation in the tension on the filament 88 necessary to operate the brake to correct for the variation will be a function of the tension setting which provides for better operation of the tensioner with less chance of breaking the filament. By using a cam 44 having a logarithmic spiral surface, the variation in the tension on the filament 88 necessary to move arm 38 through an arc sufficient to operate the brake to correct the variation, will always be substantially the same predetermined percentage of the tension setting no matter what the tension setting is. Indication lines 60a and 60c on indicator plate 60 show the limits that arm 38 can move and still provide a tension which is substantially within the predetermined percentage from the set tension. Thus, as long as the tensioner operates to maintain the movement of arm 38 between these limits, the tension will always be within a predetermined percentage of the set tension. Knowing this, it is possible to set the tension much closer to the optimum tension for the size filament being used with assurance that the tension set will always be maintained within a predetermined percentage. Another advantage achieved by the use of the logarithmic spiralled cam 44 is that it permits changing from one tension setting to another with greater ease and accuracy. In previous tensioners in which the tension is solely a function of the tension of the spring which acts on the brake changes in the tension are made by merely varying the length of the spring to vary the tension applied thereby. Thus, a slight change in the low tension region requires only a very slight change in the length of the spring while a change of the same percentage in the high tension region requires a large change in the length of the spring. However, in the tensioner of this invention, rotation of wheel 48 through a given arc will provide substantially the same percentage of change in the tension throughout the entire range of tensions. Thus, since each equal amount of rotation of wheel 48 provides substantially the same percentage change in the tension, wheel 48 can be easily and accurately calibrated to provide ease in obtaining any desired tension setting.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A filament tensioner comprising the combination of a support, a filament supply spool supporting shaft rotatably mounted on said support, brake means for controlling the speed of rotation of said shaft, a spindle rotatably mounted on said support, an arm extending radially from said spindle and having a portion engageable by said filament to pivot said arm, means on said spindle for varying the action of said brake on the shaft upon rotation of the spindle, a cam rotatably mounted on said spindle, means for securing said cam to the spindle at various positions therearound, and spring means secured to the outer surface of said cam to provide a force against which the filament must act to pivot the spindle in one direction.

2. The combination as set forth in claim 1 in which the surface of the cam to which the spring means is secured is of a spiral configuration.

3. The combination as set forth in claim 2 in which the spiral surface of the cam is a logarithmic spiral.

4. The combination as set forth in claim 1 in which said cam securing means comprises a disk rotatably mounted on said spindle and secured to said cam, a plurality of circumferential spaced notches in the periphery of said disk, an arm secured to said spindle adjacent said disk and extending radially from said spindle, a ratchet arm pivotally mounted on said arm and having a portion engageable in the notches in the disk.

5. A filament tensioner comprising the combination of a support, a filament supply spool supporting shaft rotatably mounted on said support, brake means for controlling the speed of rotation of said shaft, a spindle rotatably mounted on said support, an arm extending substantially radially from said spindle and having a portion engageable by said filament to pivot said arm, means on said spindle for varying the action of said brake on the shaft upon rotation of the spindle, a cam rotatably mounted on said spindle, means for securing said cam to the spindle at various positions therearound and a common spring means applying a force on said brake against the shaft and connected to the outer surface of said cam to provide a force against which the filament must act to pivot the spindle in one direction.

6. A filament tensioner comprising the combination of a support, a filament supply spool supporting shaft rotatably mounted on said support, a brake drum mounted on said shaft, a brake arm pivotally mounted at one end from said support and extending over said brake drum, a spindle rotatably mounted on said support, an arm extending substantially radially from said spindle and having a portion engageable by said filament to pivot said arm, a brake actuating cam mounted on said spindle beneath said brake arm, a second cam rotatably mounted on said spindle, means for securing said second cam to the spindle at various positions therearound, and a common spring means connected to said brake arm to hold it against the brake drum and brake actuating cam and connected to the outer surface of said second cam to provide a force against which the filament must act to pivot the spindle in one direction.

7. The combination as set forth in claim 6 including a pulley mounted from said support beneath the brake arm and second cam, and said spring means extending downwardly from the brake arm around said pulley and up to said second cam.

8. The combination as set forth in claim 6 in which the surface of said second cam to which the spring means is connected is of a spiral configuration.

9. The combination as set forth in claim 8 in which the spiral surface of said second cam is a logarithmic spiral.

References Cited in the file of this patent

UNITED STATES PATENTS

| | | |
|---|---|---|
| 453,073 | Biederman | May 26, 1891 |
| 1,462,604 | Lavalle | July 24, 1923 |
| 2,419,808 | Wirth | Apr. 29, 1947 |